United States Patent
Fujita

(10) Patent No.: US 10,679,072 B2
(45) Date of Patent: Jun. 9, 2020

(54) MOVING-OBJECT POSITION ESTIMATING SYSTEM, INFORMATION PROCESSING APPARATUS AND MOVING-OBJECT POSITION ESTIMATING METHOD

(71) Applicant: FUJITSU LIMITED, Kawasaki-shi, Kanagawa (JP)

(72) Inventor: Takushi Fujita, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 15/888,147

(22) Filed: Feb. 5, 2018

(65) Prior Publication Data

US 2018/0225524 A1 Aug. 9, 2018

(30) Foreign Application Priority Data

Feb. 7, 2017 (JP) .................................. 2017-020462

(51) Int. Cl.
G06K 9/00 (2006.01)
G06K 9/46 (2006.01)
(Continued)

(52) U.S. Cl.
CPC ..... *G06K 9/00791* (2013.01); *G06K 9/00664* (2013.01); *G06K 9/46* (2013.01);
(Continued)

(58) Field of Classification Search
None
See application file for complete search history.

(56) References Cited

U.S. PATENT DOCUMENTS

2013/0182906 A1 7/2013 Kojo et al.
2018/0078085 A1* 3/2018 Iacobucci ............... A47J 31/54
(Continued)

FOREIGN PATENT DOCUMENTS

JP 2004-012429 1/2004
JP 2007-263657 10/2007
(Continued)

OTHER PUBLICATIONS

JP 201615719 Self-position estimation device, self-position estimation method, and program Takazawa Kazuhiro • Sadasue Tamon • Kajiwara Yasuhiro • Aoki Masaru • Matsushita Kazufumi • Hashimoto yasuko • Shirataka Yasuko ; Feb. 23, 2015 (Year: 2015).*

*Primary Examiner* — Nancy Bitar
(74) *Attorney, Agent, or Firm* — Fujitsu Patent Center

(57) ABSTRACT

A moving-object position estimating system includes: a moving-object position estimating terminal apparatus that estimates a position a moving object; and an information storing apparatus, wherein the moving-object position estimating terminal apparatus: acquires an image in surroundings of the moving object; obtains feature point information regarding feature points of the acquired image; obtains photography environment information in surroundings of the feature points; associates the feature point information with the photography environment information to set the first environment map information; transmits, to the information storing apparatus, a request for retrieving second environment map information corresponding to the photography environment information in the first environment map information and sending back the second environment map information; and compares the feature point information included in the second environment map information with the feature point information included in the first environ- (Continued)

ment map information to estimate the position of the moving object.

15 Claims, 11 Drawing Sheets

(51) Int. Cl.
    *G06K 9/78*     (2006.01)
    *G06T 7/73*     (2017.01)
    *G06K 9/62*     (2006.01)
    *G06T 7/246*     (2017.01)

(52) U.S. Cl.
    CPC ............. *G06K 9/6202* (2013.01); *G06K 9/78* (2013.01); *G06T 7/246* (2017.01); *G06T 7/73* (2017.01); *G06T 7/74* (2017.01); *G06T 2207/30244* (2013.01); *G06T 2207/30252* (2013.01)

(56) References Cited

U.S. PATENT DOCUMENTS

2019/0019062 A1*   1/2019   Fukui ................. G06K 9/00805
2019/0025071 A1*   1/2019   Fukui ..................... G09B 29/00

FOREIGN PATENT DOCUMENTS

WO       2012/172870     12/2012
WO    WO2017168900   * 12/2016

* cited by examiner

OBTAINED GROUP OF FEATURE POINTS

TRACE OF MOVEMENT

ESTIMATED CAMERA POSITION

FIG. 8

| ENVIRONMENT MAP INFORMATION | | | | | |
|---|---|---|---|---|---|
| FEATURE POINT INFORMATION | | PHOTOGRAPHY ENVIRONMENT INFORMATION | | | |
| POSITION INFORMATION (LONGITUDE, LATITUDE, AND ALTITUDE) OF FEATURE POINT | FEATURES | PHOTOGRAPHY DATE AND TIME | PHOTOGRAPHY POSITION INFORMATION | BRIGHTNESS INFORMATION OF PHOTOGRAPHIC SUBJECT | WEATHER INFORMATION |
| (X1,Y1,Z1) | (A1,B1,C1,...) | 2017/2/2 | (u1,v1,w1) | 80 | SUNNY |
| (X2,Y2,Z2) | (A2,B2,C2,...) | 2017/2/2 | (u2,v2,w2) | 79 | SUNNY |
| (X3,Y3,Z3) | (A3,B3,C3,...) | 2017/2/2 | (u3,v3,w3) | 82 | SUNNY |
| ... | ... | ... | ... | ... | ... |

MOVING-OBJECT POSITION ESTIMATING SYSTEM, INFORMATION PROCESSING APPARATUS AND MOVING-OBJECT POSITION ESTIMATING METHOD

CROSS-REFERENCE TO RELATED APPLICATION

This application is based upon and claims the benefit of priority of the prior Japanese Patent Application No. 2017-020462, filed on Feb. 7, 2017, the entire contents of which are incorporated herein by reference.

FIELD

The embodiments discussed herein are related to a moving-object position estimating system, an information processing apparatus and a moving-object position estimating method.

BACKGROUND

In recent years, development of autonomous moving objects, such as autonomous vehicles and robots, is under way.

Japanese Laid-open Patent Publication No. 2007-263657, International Publication Pamphlet No. 2012/172870, or Japanese Laid-open Patent Publication No. 2004-12429 discloses related technologies.

SUMMARY

According to an aspect of the embodiments, a moving-object position estimating system includes: a moving-object position estimating terminal apparatus that estimates a position a moving object; and an information storing apparatus that stores first environment map information transmitted from the moving-object position estimating terminal apparatus, wherein the moving-object position estimating terminal apparatus: acquires an image in surroundings of the moving object; obtains feature point information regarding feature points of the acquired image; obtains photography environment information in surroundings of the feature points in synchronization with acquiring the image; associates the feature point information with the photography environment information to set the associated feature point information and photography environment information as the first environment map information; transmits, to the information storing apparatus, a request for retrieving second environment map information corresponding to the photography environment information in the first environment map information from the environment map information prior to the first environment map information and sending back the second environment map information; receives the second environment map information; and compares the feature point information included in the second environment map information with the feature point information included in the first environment map information to estimate the position of the moving object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates one example of environment map information stored in environment map information;

DESCRIPTION OF EMBODIMENTS

An autonomous moving object moves to a destination autonomously while recognizing the position of the autonomous moving object, based on map information. Thus, the position of the autonomous moving object in the map information is continuously recognized in real time.

For example, a three-dimensional image of the surroundings of a vehicle is acquired using a distance-measuring camera mounted on the vehicle, and feature points in the acquired three-dimensional image are compared with feature points in a known three-dimensional image to thereby estimate the position of the moving object. In a moving object used inside a room, an image acquired by photography in a ceiling direction by using a camera mounted on the moving object is compared with a large number of images acquired by pre-photography in the ceiling direction under a different condition, such as lighting, to thereby estimate the position of the moving object.

For example, in the aforementioned technologies, how feature points look vary depending on a condition, such as weather, which may make it difficult to compare feature points in a newly acquired three-dimensional image with feature points in a known three-dimensional image and may, thus making it difficult to perform position estimation. Since an image acquired by the camera mounted on the moving object is compared with all images pre-acquired under a different condition, it may take a computational processing time.

For example, a moving-object position estimating system that is capable of estimating the position of a moving object in a short period of time even when the environment changes may be provided.

Since the "moving-object position estimating system" includes a "moving-object position estimating terminal apparatus" and an "information storing apparatus", a description will also be given of the "moving-object position estimating terminal apparatus" and the "information storing apparatus" in conjunction with the entire "moving-object position estimating system". Control performed by the controller in the moving-object position estimating terminal apparatus may be synonymous with executing a moving-object position estimating method. The moving-object position estimating terminal apparatus may be referred to as a "vehicle-mounted apparatus", and the information storing apparatus may be referred to as a "server apparatus".

Figure 1:
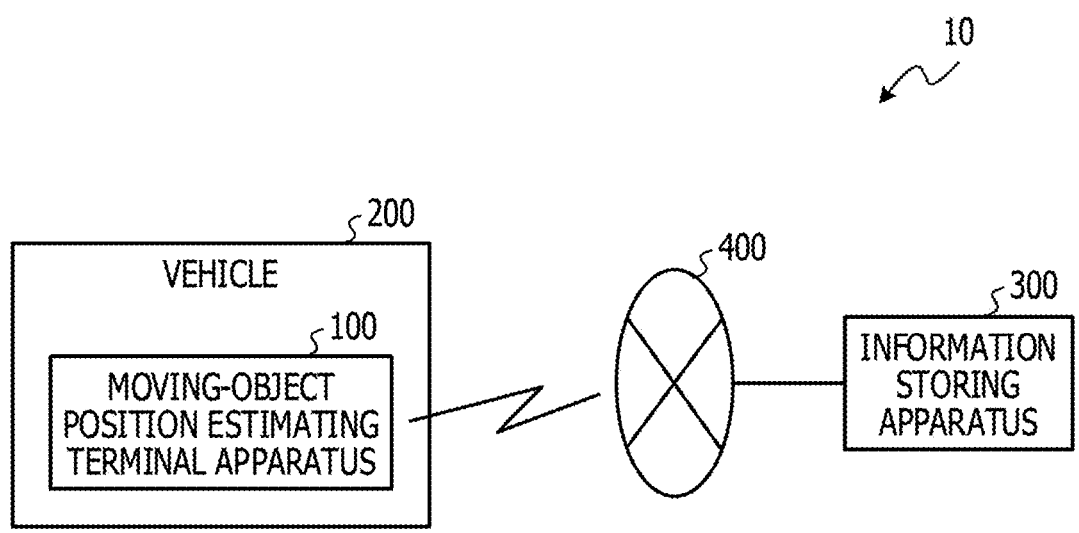
FIG. 1 illustrates one example of the configuration of a moving-object position estimating system including an information storing apparatus and a moving-object position estimating terminal apparatus.

FIG. 1 illustrates one example of the configuration of a moving-object position estimating system 10 including a moving-object position estimating terminal apparatus 100 and an information storing apparatus 300. When the moving-object position estimating terminal apparatus 100 is operated, a moving-object position estimating method is executed. As illustrated in FIG. 1, the moving-object position estimating system 10 takes a form of the so-called connected car. That is, an image of the surroundings of the vehicle 200 is acquired by using a camera in the moving-object position estimating terminal apparatus 100 mounted on a vehicle 200, which is a moving object, and first environment map information in which feature point information in the acquired image is associated with photography environment information obtained during the image acquisition is stored in the information storing apparatus 300, which is a database, through a network 400 and is accumulated. The moving-object position estimating system 10 is a system in which the moving-object position estimating terminal apparatus 100 estimates the position of the vehicle 200 based on past second environment map information and the most-recent first environment map information which are accumulated in the information storing apparatus 300.

For example, in the technology called simultaneous localization and mapping (SLAM), an environment map can be created based on feature points or the like in an image acquired by photographing the surroundings of a moving object, and the position of the moving object in the created environment map can be estimated. However, in a case in which the weather is sunny and bright when the environment map is created for the first time, and then the weather is cloudy and dark when the moving objects moves back to the same position, feature points in images acquired at the same position may differ from each other, which may make it difficult to compare the feature points and make it difficult to estimate the position of the moving object. For example, in the moving-object position estimating system 10, even when the photography environment, such as weather, changes, the position of a moving object is estimated in a short period of time.

For example, in the moving-object position estimating system 10, the moving-object position estimating terminal apparatus 100 acquires an image of the surroundings of the vehicle 200 and obtains the first environment map information in which photography environment information, such as ambient brightness and weather, at the time of the image acquisition and the feature point information in the acquired image are associated with each other.

Figure 2:
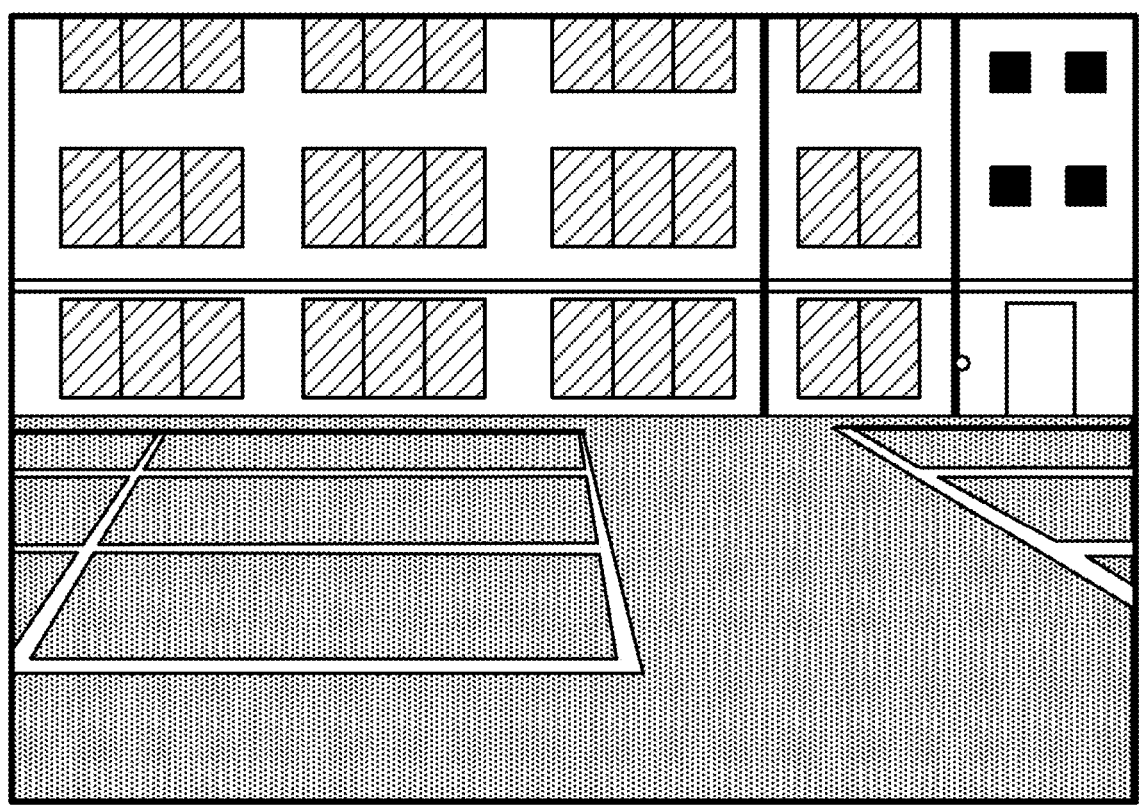
FIG. 2 illustrates one example of an image acquired by a camera.
Figure 3:
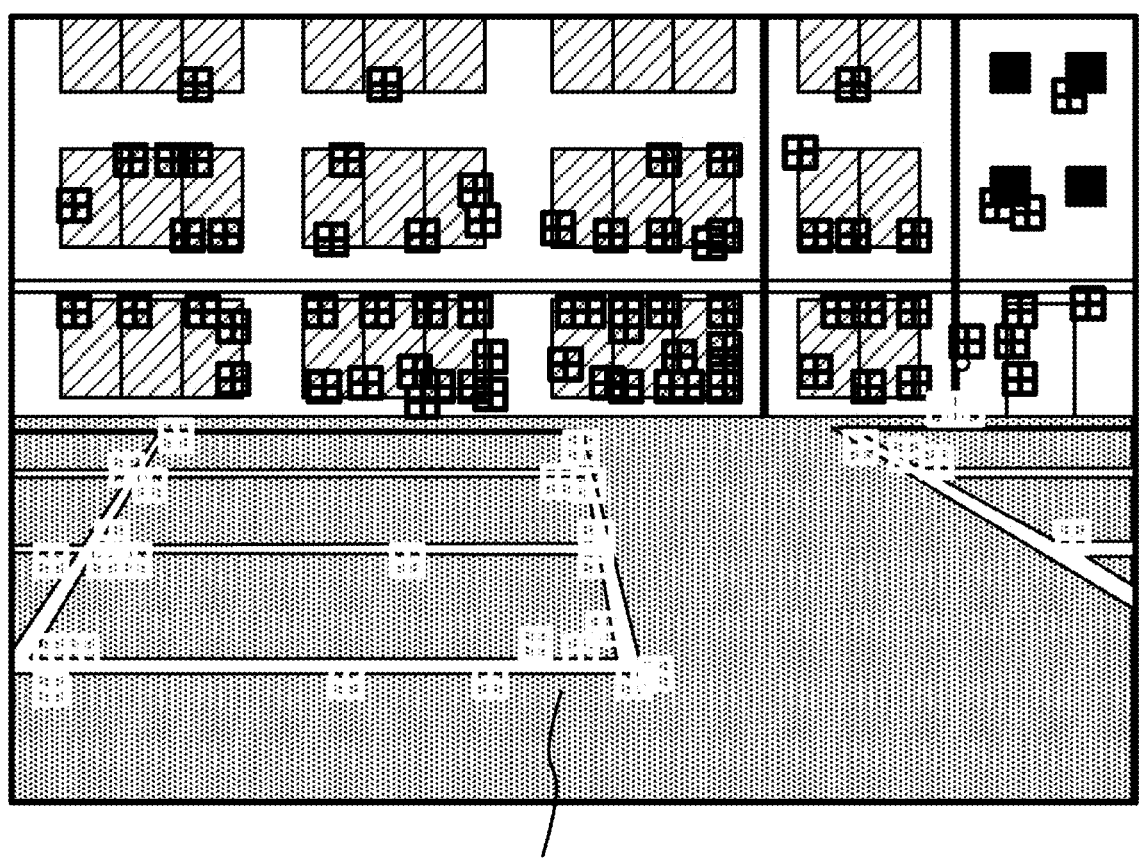
FIG. 3 illustrates one example of a group of feature points extracted from the image illustrated in FIG. 2.
Figure 4:
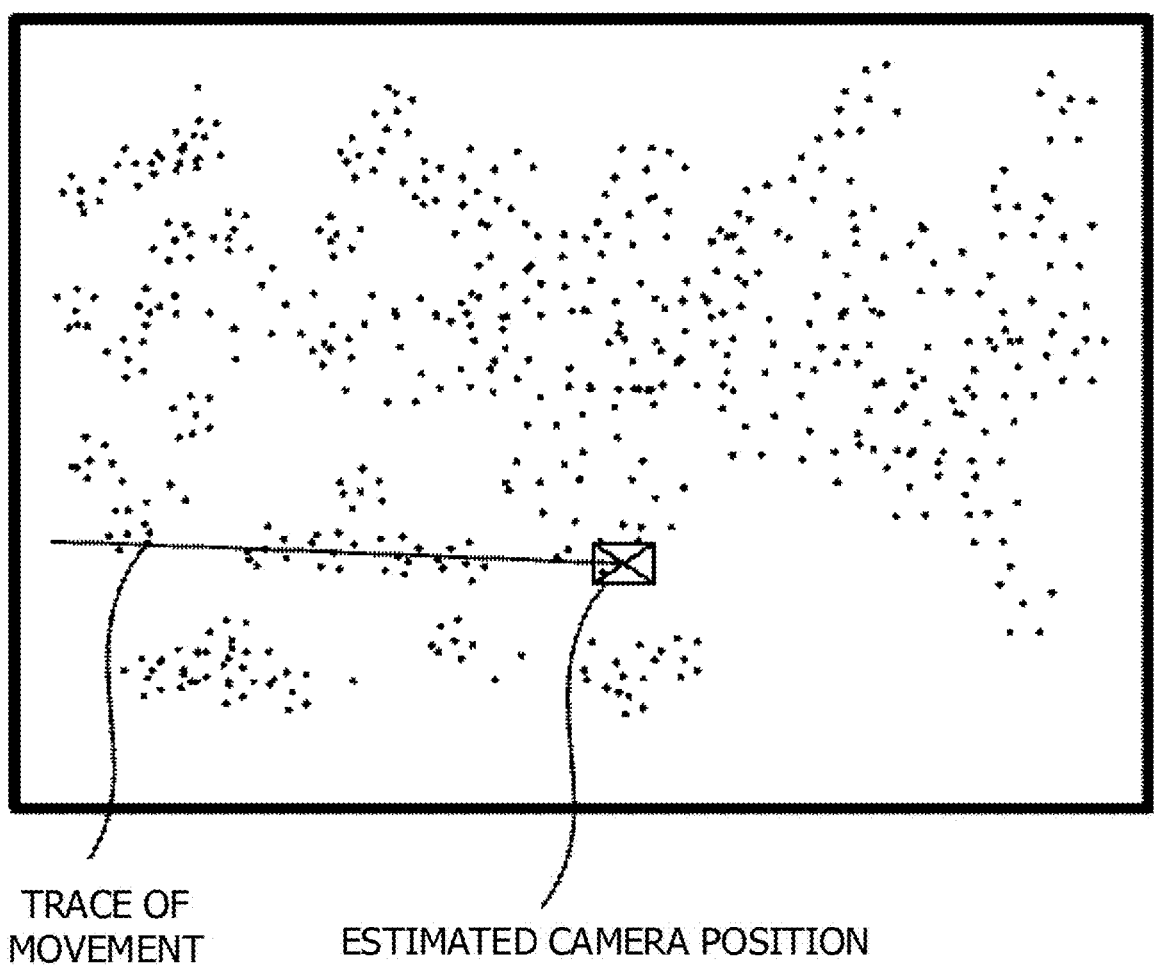
FIG. 4 illustrates one example of an environment map based on FIG. 3.

The feature point information in the image of the surroundings of the vehicle 200 includes position information including features at feature points and three-dimensional coordinate information of the feature points. The feature points (like those illustrated in FIG. 4) in an image may be extracted by extracting a group of feature points, like those illustrated in FIG. 3, from an image (like that illustrated in FIG. 2) acquired by photographing the surroundings of the vehicle 200.

The moving-object position estimating terminal apparatus 100 transmits, to the information storing apparatus 300, a request for sending back second environment map information corresponding to the photography environment information in the first environment map information, and compares feature point information included in the second environment map information sent back from the information storing apparatus 300 with the feature point information included in the first environment map information to estimate the position of the vehicle 200. The "second environment map information corresponding to the photography environment information in the first environment map information" means "second environment map information for an image acquired in a photography environment that is the same as or similar to the photography environment where the image corresponding to the first environment map information was acquired". Thus, it is preferable that the information storing apparatus 300 extract the second environment map information including photography environment information that matches photography environment information in the first environment map information exactly. However, it is sufficient to be able to extract most-similar second environment map information, and second environment map information in a predetermined similar range may be extracted.

The moving-object position estimating terminal apparatus 100 transmits the first environment map information to the information storing apparatus 300. The information storing apparatus 300 stores the received first environment map information in a database to update the database. This makes it possible to accumulate environment map information in various photography environments and makes it possible to update the environment map information to most-recent environment map information. This makes it easier to compare the first and second feature point information even when the photography environment changes, thus making it possible to reliably estimate the position of the vehicle 200 in a long period of time.

Upon receiving, from the moving-object position estimating terminal apparatus 100, a request for sending back the second environment map information corresponding to the photography environment information in the first environment map information, the information storing apparatus 300 transmits the second environment map information to the moving-object position estimating terminal apparatus 100, the second environment map information being retrieved from a database of the second environment map information, based on the photography environment information in the first environment map information. Since the information storing apparatus 300 retrieves the second environment map information from the database of the second environment map information, based on the photography environment information in the first environment map information, as described above, it is possible to estimate the position of the vehicle 200 in a short period of time without referring to all the second environment map information in the database of the second environment map information, which makes it easier to realize real-time processing.

It is preferable that, from the standpoint of increasing the amount of obtainable environment map information to enhance the update frequency of the environment map information, the number of vehicles 200 on which the moving-object position estimating terminal apparatuses 100 are mounted be two or more and be increased. Also, the number of information storing apparatus 300 may be two or more. Examples of the vehicle 200 include a large-size automobile, a mid-size automobile, a normal-size automobile, a large-size special automobile, a small-size special automobile, a large-size motorcycle, and a normal-size motorcycle, and it is preferable that vehicle 200 is an autonomous vehicle in an autonomous driving system.

Figure 5:
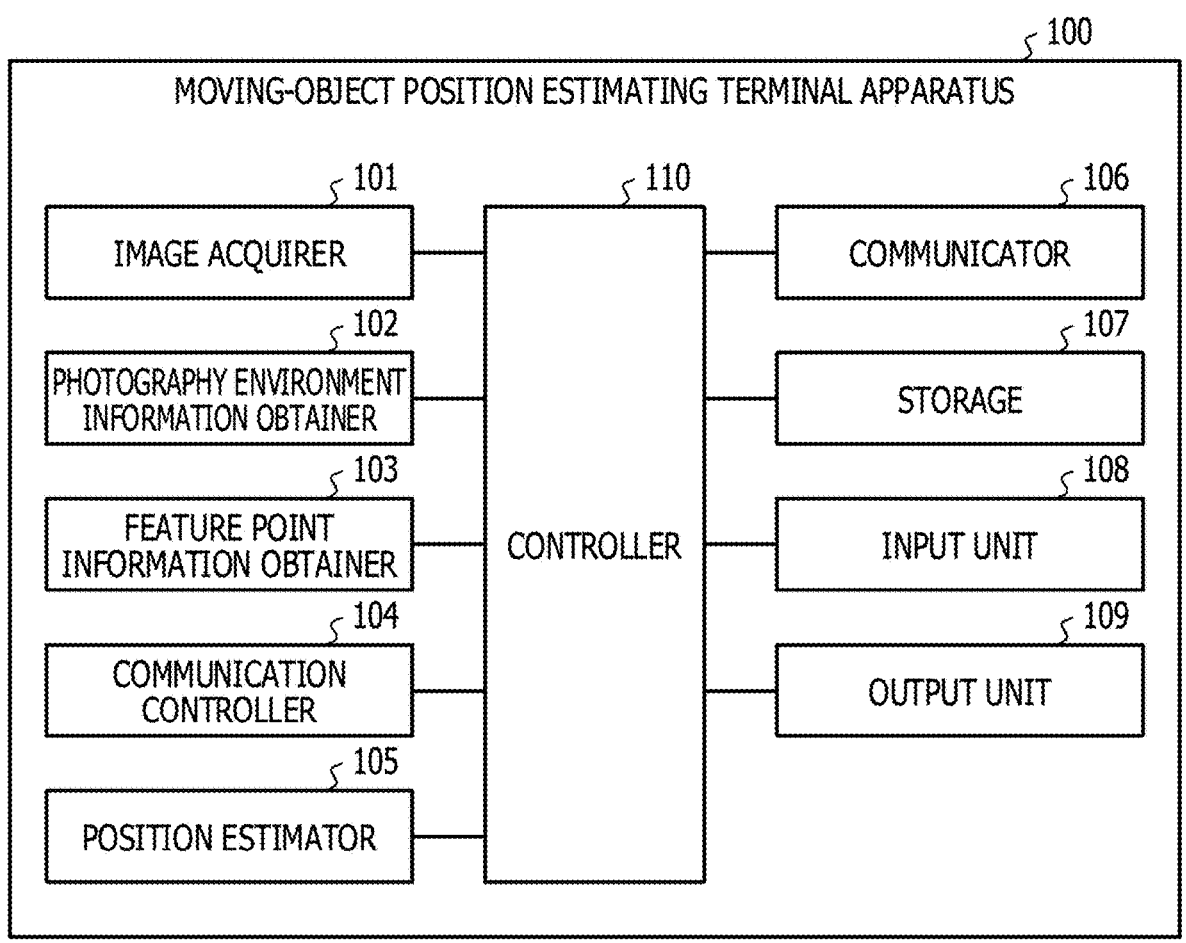
FIG. 5 illustrates one example of a functional configuration of the moving-object position estimating terminal apparatus.

FIG. 5 illustrates one example of a functional configuration of the moving-object position estimating terminal apparatus 100. As illustrated in FIG. 5, the moving-object position estimating terminal apparatus 100 acquires an image of the surroundings of the vehicle 200 and estimates the position of the vehicle 200 by comparing the first environment map information at the time of acquisition of an image with the second environment map information prior to the first environment map information. The moving-object position estimating terminal apparatus 100 includes an image acquirer 101, a photography environment information obtainer 102, a feature point information obtainer 103, a communication controller 104, a position estimator 105, a communicator 106, a storage 107, an input unit 108, an output unit 109, and a controller 110.

Figure 10:
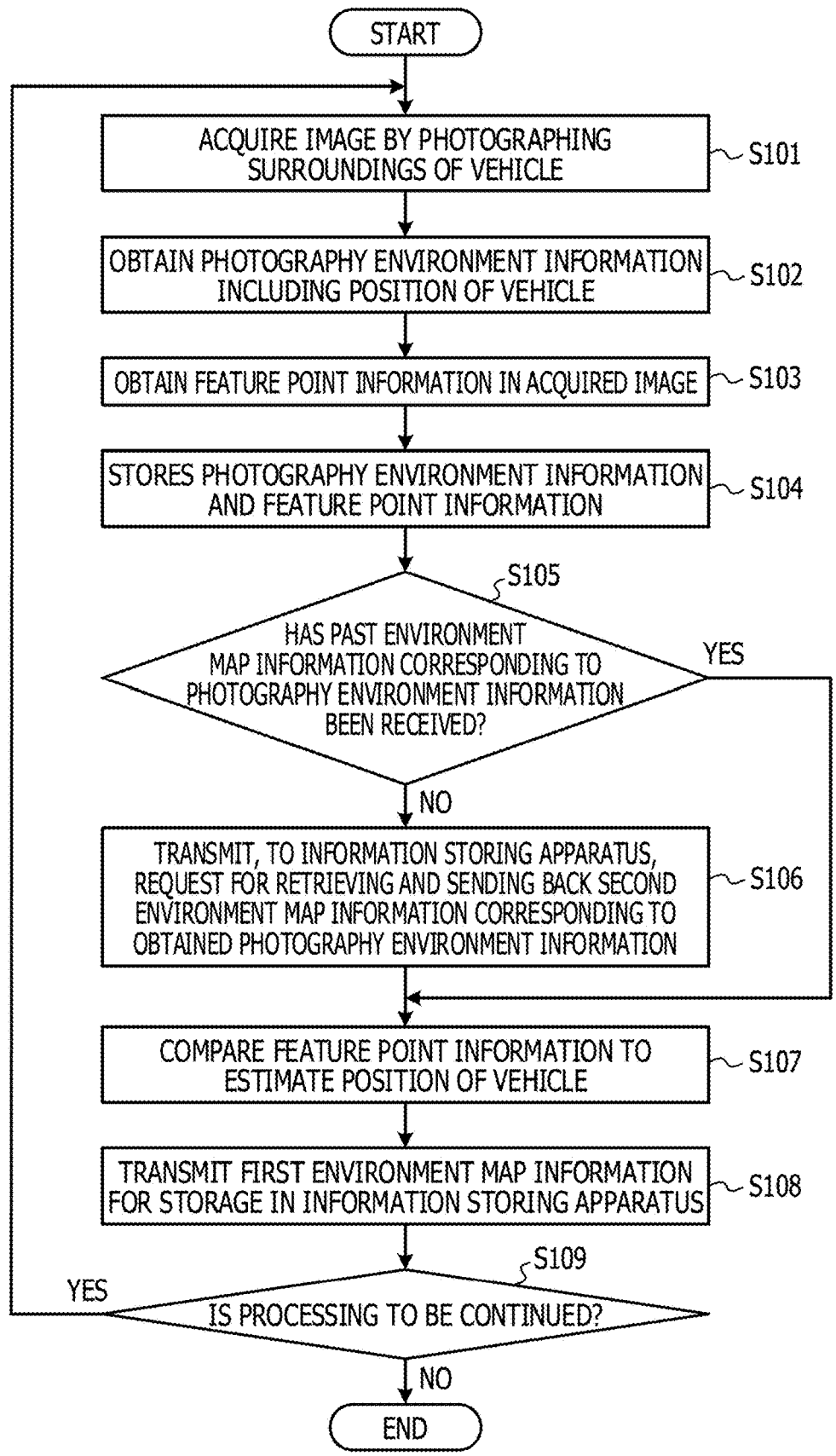
FIG. 10 illustrates one example of processing in which the moving-object position estimating terminal apparatus estimates the position of a vehicle.

The image acquirer 101 acquires an image by photographing the surroundings of the vehicle 200 by using a camera installed on the vehicle 200 (S101 in FIG. 10).

The photography environment information obtainer 102 obtains photography environment information in the surroundings of feature points in synchronization with the image acquirer 101 (S102 in FIG. 10).

The feature point information obtainer 103 obtains feature point information regarding the feature points in the image acquired by the image acquirer 101 (S103 in FIG. 10). The feature point information obtainer 103 associates relative position coordinates relative to the vehicle 200 with the feature points in the image acquired by the image acquirer 101. For example, the feature point information in the image includes features at the feature points and includes relative position coordinates (or relative directions) of the feature points relative to the vehicle 200 as position information of the feature points. One possible example of a method for obtaining relative position coordinates of the feature points relative to the vehicle 200 is a method for determining position information of feature points based on distance information obtained using a distance-measuring camera, but the method is not limited thereto and may be implemented by another method. For example, the relative position coordinates of the feature points relative to the vehicle 200 may be determined using motion stereo using motion parallax resulting from movement of the vehicle 200. The method for obtaining features at the feature points is not particularly limiting and may be appropriately selected depending on the purpose and may be, for example, a feature-obtaining method based on a scheme using speeded-up robust features (SURF), rotation-invariant fast features (RIFF), or the like.

The communication controller 104 associates the feature point information in an image of the surroundings of the vehicle 200 with the photography environment information in the surroundings of feature points, sets the associated feature point information and photography environment information as the first environment map information, and performs control on transmitting, to the information storing apparatus 300, a request for retrieving the second environment map information corresponding to the photography environment information in the first environment map information and sending back the second environment map information (S106 in FIG. 10) and on receiving the sent back second environment map information from the information storing apparatus 300. The communication controller 104 performs control on transmitting the first environment map information for storage in the information storing apparatus 300 (S108 in FIG. 10).

In this case, the frequency at which the communication controller 104 transmits, to the information storing apparatus 300, the request for sending back the second environment map information may be at predetermined time intervals or for each predetermined area. A case in which the request is transmitted for each predetermined area is, for example, a case in which a request for sending back environment map information of an entire parking place is transmitted when the vehicle 200 has moved to an entrance of the parking place. In addition, when the photography environment changes, for example, when the sun sets while in a parking place, a request for sending back the environment map information again may be issued.

The position estimator 105 compares the feature point information included in the second environment map information received from the information storing apparatus 300 with the feature point information included in the first environment map information to estimate the position of the vehicle 200 (S107 in FIG. 10). The feature point information included in the second environment map information includes, for example, absolute position coordinates on the earth which are defined by latitudes, longitudes, and altitudes as the position information of the feature points. The feature point information included in the first environment map information includes information of the relative position coordinates (or relative directions) of the feature points relative to the vehicle 200 as the position information of the feature points. The position estimator 105 associates feature points at which features are the same or similar to each other between the feature point information in the first environment map information and the feature point information in the second environment map information and applies, with respect to a pair of the associated feature points, the relative position coordinates of the feature points relative to the vehicle 200 in the first environment map information to the absolute position coordinates of the feature points in the second environment map information to thereby estimate the absolute position of the vehicle 200. The absolute position coordinates on the earth may be determined for all the feature points that are included in the first environment map information and for which the relative position coordinates relative to the vehicle 200 were obtained, based on the absolute position coordinates relative to the vehicle 200 which were estimated as described above, and the absolute position coordinates of the determined feature points are stored in the database of the second environment map information.

Based on instructions from the communication controller 104, the communicator 106 transmits/receives various types of information and requests to/from the information storing apparatus 300 through the network 400.

Based on instructions from the controller 110, the storage 107 associates the photography environment information with the feature point information in images and stores the associated information as environment map information. Based on instructions from the controller 110, the storage 107 stores various programs installed in the moving-object position estimating terminal apparatus 100, data generated by executing the programs, and so on.

Based on instructions from the controller 110, the input unit 108 receives various instructions for the moving-object position estimating terminal apparatus 100.

Based on instructions from the controller 110, the output unit 109 displays an internal state of the moving-object position estimating terminal apparatus 100.

The controller 110 executes the various programs stored in the storage 107 to control the entire moving-object position estimating terminal apparatus 100. The image acquirer 101, the photography environment information obtainer 102, the feature point information obtainer 103, the communication controller 104, and the position estimator 105 have been described above as being independent from the controller 110, at least one of the functions of the image acquirer 101, the photography environment information obtainer 102, the feature point information obtainer 103, the communication controller 104, and the position estimator 105 may be included in the controller 110.

Figure 6:
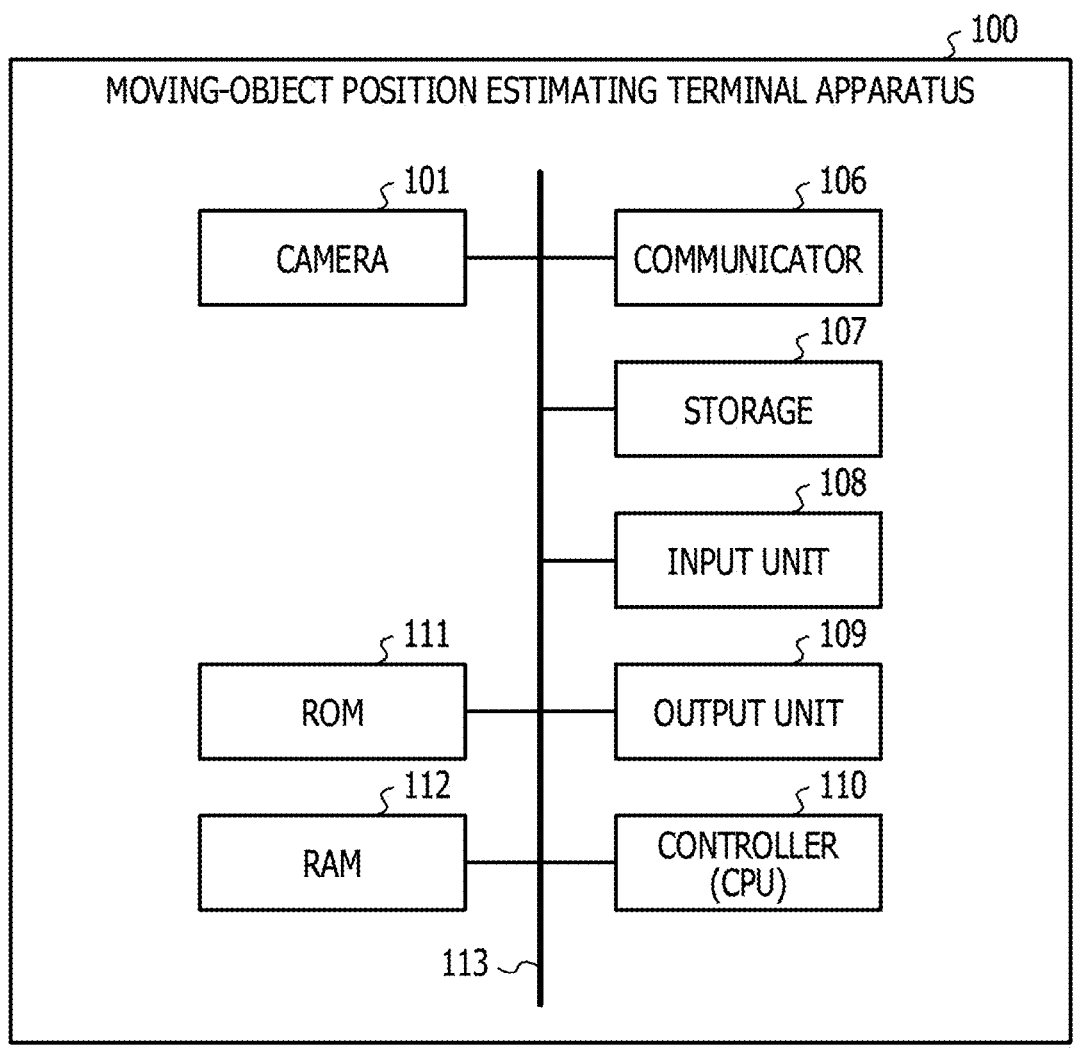
FIG. 6 illustrates one example of a hardware configuration of the moving-object position estimating terminal apparatus.

FIG. 6 illustrates one example of a hardware configuration of the moving-object position estimating terminal apparatus 100. As illustrated in FIG. 6, the moving-object position estimating terminal apparatus 100 includes a camera 101, the communicator 106, the storage 107, the input unit 108, the output unit 109, the controller 110, a read-only memory (ROM) 111, and a random-access memory (RAM) 112. The constituent elements in the moving-object position estimating terminal apparatus 100 are communicably connected to each other through a bus 113.

The camera 101 is not particularly limiting, as long as it is capable of acquiring images by photographing the surroundings of the vehicle 200. The camera 101 is, for example, a distance-measuring camera, such as a stereo camera or a monocular camera that is capable of measuring a distance, and may be implemented by a product on the market. The camera 101 may or may not outhave the distance-measuring function and may be a general camera. In the case of a general camera, when the amount of movement when the vehicle 200 on which the camera 101 is mounted moves is known, it is possible to determine the distance from the camera 101 to a stationary object by using the principle of motion stereo utilizing the fact that motion parallax occurs between a plurality of images acquired by the same camera at different time points.

Figure 7:
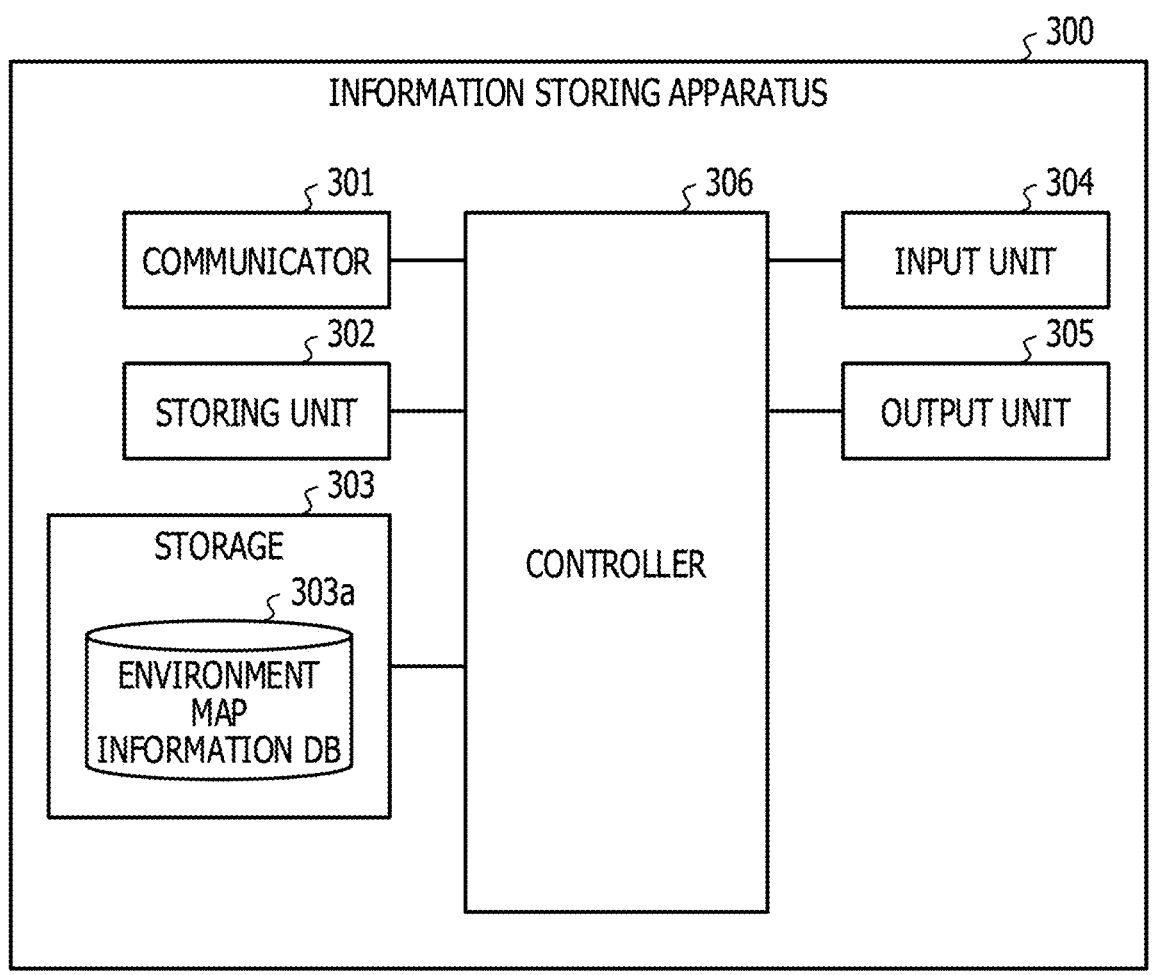
FIG. 7 illustrates one example of a functional configuration of the information storing apparatus.

The communicator 106 is not particularly limiting, as long as it is communicably connected to a communicator 301 in the information storing apparatus 300 illustrated in FIG. 7, and may be implemented by a known communicator as appropriate. One example of the communicator 106 is a transceiver for utilizing telematics.

The storage 107 may be appropriately selected depending on the purpose, as long as it is capable of storing various types of information. The storage 107 may be, for example, a solid-state drive or a hard-disk drive, may be a portable storage device, such as a compact disk (CD) drive, a digital versatile disc (DVD) drive, or a Blu-ray® disc (BD) drive, or may be a part of a cloud that is a group of computers on a network.

The input unit 108 is not particularly limiting, as long as it is capable of receiving various requests for the moving-object position estimating terminal apparatus 100 and may be implemented by a known output unit as appropriate. Examples of the input unit 108 include a keyboard, a mouse, a touch panel, and a microphone.

The output unit 109 is not particularly limiting and may be implemented by a known output unit as appropriate. Examples of the output unit 109 include a display and a speaker.

One example of the controller 110 is a central processing unit (CPU). A processor that executes software is hardware.

The ROM 111 stores therein various programs, data, and so on that the controller 110 uses to execute various programs stored in the storage 107. Specifically, the ROM 111 stores boot programs, such as a Basic Input/Output System (BIOS) and an extensible firmware interface (EFI) therein.

The RAM 112 is a primary storage device and serves as a work area in which the various programs stored in the storage 107 are loaded when they are executed by the controller 110. Examples of the RAM 112 include a dynamic random-access memory (DRAM) and a static random-access memory (SRAM).

FIG. 7 illustrates one example of a functional configuration of the information storing apparatus 300. The information storing apparatus 300 stores the first environment map information obtained by the moving-object position estimating terminal apparatus 100. As illustrated in FIG. 7, the information storing apparatus 300 includes the communicator 301, a storing unit 302, a storage 303, an input unit 304, an output unit 305, and a controller 306.

Figure 11:
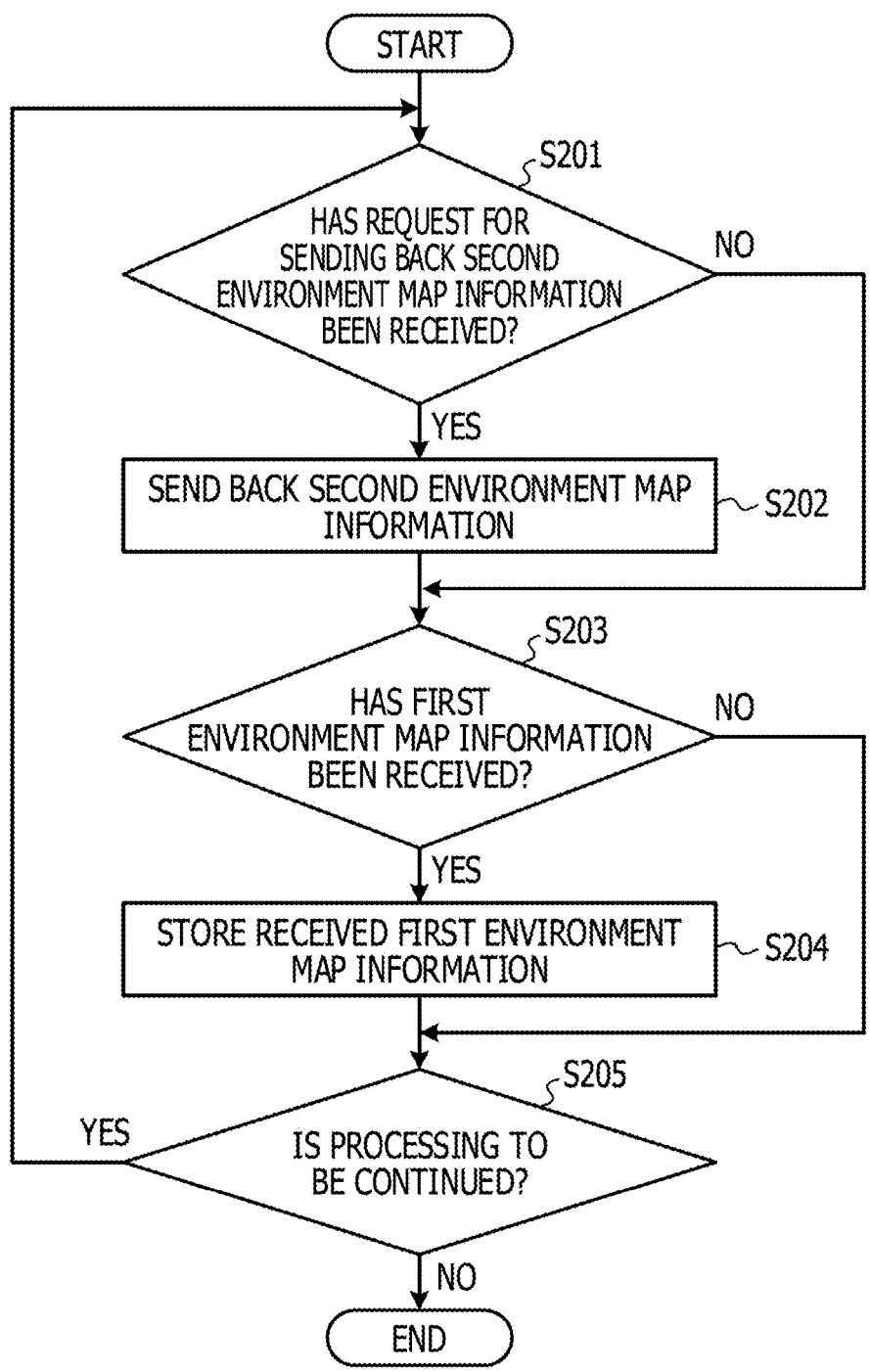
FIG. 11 illustrates one example of processing in which the information storing apparatus transmits/receives first or second environment map information to/from the moving-object position estimating terminal apparatus.

Based on an instruction from the controller 306, the communicator 301 receives, from the moving-object position estimating terminal apparatus 100, a request for retrieving and sending back the second environment map information corresponding to the photography environment information in the first environment map information (S201 in FIG. 11) and sends back the requested second environment map information to the moving-object position estimating terminal apparatus 100 (S202 in FIG. 11). The communicator 301 receives the first environment map information from the moving-object position estimating terminal apparatus 100 (S203 in FIG. 11).

The storing unit 302 stores, in an environment map information database 303a in the storage 303, the first environment map information received from the moving-object position estimating terminal apparatus 100 (S204 in FIG. 11). The database may also be referred to as a "DB". It is preferable that, before the storing unit 302 stores the first environment map information, the degree of reliability of the feature point information included in the first environment map information be determined, and only the feature point information having a high degree of reliability be stored. This is because there is a possibility that the feature point information includes error or the like. Examples of a method for determining the degree of reliability of the feature point information include a method for determining the degree of reliability based on an estimated error value and a method for determining the degree of reliability by performing statistical processing on the feature point information received from a plurality of moving-object position estimating terminal apparatuses 100. The information storing apparatus 300 or the moving-object position estimating terminal apparatus 100 may determine the degree of reliability of the feature point information.

The storage 303 includes the environment map information DB 303a, and stores therein various programs installed in the moving-object position estimating terminal apparatus 100, data generated by executing the programs, and so on, based on instructions from the controller 306.

FIG. 8 illustrates one example of the environment map information stored in the environment map information. As illustrated in FIG. 8, in the environment map information DB 303a, the environment map information contains feature point information and photography environment information, and information of items "position information of feature points and features", which are the feature point information, and information of items "photography date and time, photography position information, brightness information of photographic subject, and weather information", which are the photography environment information, may be stored in association with each other.

The "position information of feature points" may be information of absolute position coordinates on the earth which are defined by latitudes, longitudes, and altitudes. The "features" may be information of features obtained by, for example, a scheme, such as SURF or RIFF.

The "photography date and time" may be information of the date and time when the camera 101 acquired an image by photographing the surroundings of the vehicle 200. The "photography position information" may be the position of the camera 101 when an image from which the feature point information was obtained was acquired, and is defined by, for example, the values of a latitude, a longitude, and an altitude. The "photography position information" is represented by relative position coordinates calculated based on the position information of the camera 101 and the position information of the vehicle 200 and indicates a positional relationship between a feature point and the vehicle 200 in three-dimensional coordinates. In the present embodiment, the "brightness information of photographic object" is information obtained as a numerical value of 0 to 100 based on the luminance of an acquired image. In the present embodiment, the "weather information" is information obtained from external weather information and information or weather in the surroundings of a feature point at the time of image acquisition. One of items "sunny", "cloudy", "rainy", and "snowy" is selected based on the external weather information. Although the photography environment information has been described above as being the information of the items "photography date and time, photography position information, brightness information of photographic subject, and weather information", the present disclosure is not limited thereto. Example of the photography environment information include a luminance average value of an entire image, luminance histogram of an entire image, and color histogram of an entire image.

The input unit 304 receives various requests from a user in accordance with instructions from the controller 306.

The output unit 305 outputs images, sound, and so on to be used by the user, in accordance with instructions from the controller 306.

The controller 306 retrieves the second environment map information corresponding to the photography environment information in the first environment map information. For example, the controller 306 retrieves the second environment map information for an image acquired in a photography environment that is the same as or similar to a photography environment where an image corresponding to the first environment map information was obtained. A method for determining whether or not the photography environment information in the first environment map information and the photography environment information in the second environment map information are the same or similar to each other is, for example, a method for calculating the degree of similarity based on pieces of information included in the photography environment information and determining that they are similar to each other when the degree of similarity of the photography environment information is higher than or equal to a predetermined value. The controller 306 executes various programs stored in the storage 303 to control the entire moving-object position estimating terminal apparatus 100. Although the storing unit 302 and the controller 306 have been described above as being independent from each other, the controller 110 may have the functions of the storing unit 302.

Figure 9:
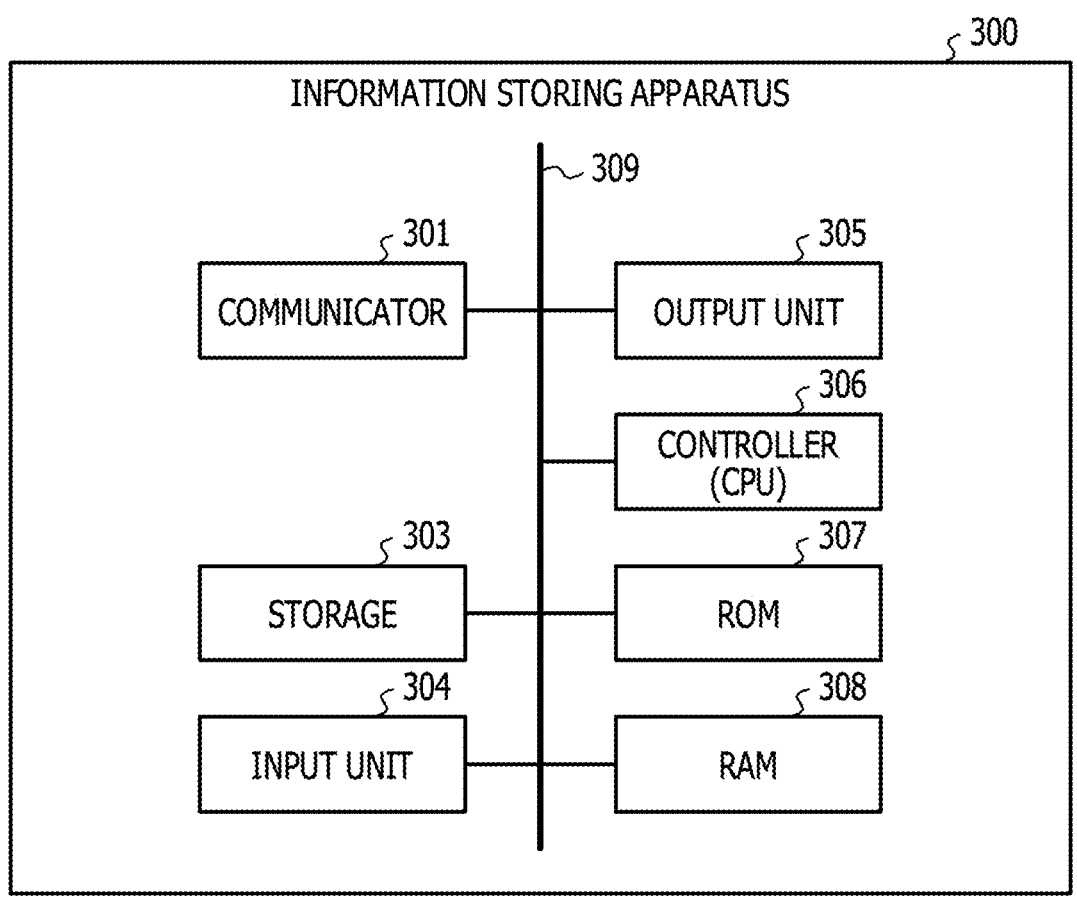
FIG. 9 illustrates one example of a hardware configuration of the information storing apparatus.

FIG. 9 illustrates one example of a hardware configuration of the information storing apparatus 300. As illustrated in FIG. 9, the information storing apparatus 300 includes the communicator 301, the storage 303, the input unit 304, the output unit 305, the controller 306, a ROM 307, and a RAM 308. The individual constituent elements in the information storing apparatus 300 are communicably connected to each other through a bus 309.

The communicator 301 is not particularly limiting, as long as it is communicably connected to the communicator 106 in the moving-object position estimating terminal apparatus 100 illustrated in FIG. 5, and may be implemented by a known communicator as appropriate. One example of the communicator 106 is a transceiver for utilizing telematics.

The storage 303 may be appropriately selected depending on the purpose, as long as it is capable of storing various types of information. The storage 303 may be, for example, a solid-state drive or a hard-disk drive, may be a portable storage device, such as a CD drive, a DVD drive, or a BD drive, or may be a part of a cloud that is a group of computers on a network.

The input unit 304 is not particularly limiting, as long as it is capable of receiving various requests from a user and may be implemented by a known input unit as appropriate. Examples of the input unit 304 include a touch panel and a microphone.

The output unit 305 is not particularly limiting and may be implemented by a known output unit as appropriate. Examples of the output unit 305 include a display and a speaker.

One example of the controller 306 is a CPU.

The ROM 307 stores therein various programs, data, and so on that the controller 306 uses to execute the various programs stored in the storage 303. Specifically, the ROM 307 stores a boot program, such as a BIOS or an EFI, therein.

The RAM 308 is a primary storage device and serves as a work area in which the various programs stored in the storage 303 are loaded when they are executed by the controller 306. Examples of the RAM 308 include a DRAM and an SRAM.

FIG. 10 illustrates one example of processing in which the moving-object position estimating terminal apparatus estimates the position of a vehicle. A flow of the moving-object position estimating terminal apparatus 100 estimating the position of the vehicle 200 will now be described in accordance with the flowchart illustrated in FIG. 10 and with reference to FIGS. 1 and 5.

In operation S101, the image acquirer 101 acquires an image by photographing the surroundings of the vehicle 200 by using a camera. Thereafter, the process proceeds to S102.

In operation S102, the photography environment information obtainer 102 obtains photography environment information of the surroundings of the vehicle 200 in synchronization with the image acquirer 101. Thereafter, the process proceeds to S103. Photography environment information other than position information may be determined based on an image of the surroundings of the vehicle 200, the image being acquired by the image acquirer 101, or based on information obtained externally. The photography environment information of the surroundings of the vehicle 200 means photography environment information of the surroundings of feature points in an image acquired by photographing the surroundings of the vehicle 200.

In operation S103, the feature point information obtainer 103 obtains feature point information in the image acquired by the image acquirer 101. Thereafter, the process proceeds to S104.

In operation S104, in accordance with an instruction from the controller 110, the photography environment information in the surroundings of the feature points and the feature point information in the image are associated with each other and are stored in the storage 107 as environment map information.

In operation S105, the controller 110 determines whether or not the second environment map information corresponding to the photography environment information in the first environment map information has been received from the information storing apparatus 300. If the controller 110 determines that the second environment map information has been received from the information storing apparatus 300, the process proceeds to S107, and if the controller 110 determines that the second environment map information has not been received from the information storing apparatus 300, the process proceeds to S106.

In operation S106, the communication controller 104 performs control on transmitting, to the information storing apparatus 300, a request for retrieving and sending back the second environment map information corresponding to the photography environment information obtained in S102 and on receiving the second environment map information sent back from the information storing apparatus 300. Thereafter, the process proceeds to S107.

In operation S107, the position estimator 105 compares feature point information included in the second environment map information received from the information storing apparatus 300 with feature point information included in the first environment map information obtained in S103 to estimate the position of the vehicle 200. Thereafter, the process proceeds to S108.

In operation S108, the communication controller 104 performs control on transmitting the first environment map information for storage in the information storing apparatus 300. Thereafter, the process proceeds to S109.

In operation S109, the controller 110 determines whether or not the processing is to be continued. If the controller 110 determines that the processing is to be continued, the process returns to S101, and if the controller 110 determines that the processing is not to be continued, the processing ends.

FIG. 11 illustrates one example of processing in which the information storing apparatus 300 transmits/receives the first or second environment map information to/from the moving-object position estimating terminal apparatus 100. A flow of the information storing apparatus 300 transmitting/receiving the first or second environment map information to/from the moving-object position estimating terminal apparatus 100 will be described below in accordance with the flowchart illustrated in FIG. 11 and with reference to FIGS. 1, 5, and 7.

In operation S201, the controller 306 determines whether or not the communicator 301 has received, from the communication controller 104 in the moving-object position estimating terminal apparatus 100, a request for sending back the second environment map information corresponding to the photography environment information in the first environment map information. If the controller 306 determines that the communicator 301 has received the request for sending back the second environment map information, the process proceeds to S202, and if the controller 306 determines that the communicator 301 has not received the request, the process proceeds to S203.

In operation S202, the controller 306 instructs the communicator 301 to send back the second environment map information requested by the moving-object position estimating terminal apparatus 100. Thereafter, the process proceeds to S203.

In operation S203, the controller 306 determines whether or not the communicator 301 has received the first environment map information from the moving-object position estimating terminal apparatus 100. If the controller 306 determines that the communicator 301 has received the first environment map information, the process proceeds to S204, and if the controller 306 determines that the communicator 301 has not received the first environment map information, the process proceeds to S205.

In operation S204, the storing unit 302 stores, in the environment map information DB 303a in the storage 303, the first environment map information received from the moving-object position estimating terminal apparatus 100. Thereafter, the process proceeds to S205.

In operation S205, the controller 306 determines whether or not the processing is to be continued. If the controller 306 determines that the processing is to be continued, the process returns to S201, and if the controller 306 determines that the processing is not to be continued, the processing ends.

Although the moving object has been described above as being the vehicle 200, the moving object is not limited thereto and may be, for example, a robot or a drone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving-object position estimating system comprising:
   a moving-object position estimating terminal apparatus including a first memory and a first processor configured to estimate a position of a moving object; and
   an information storing apparatus including a second memory and a second processor, the second memory configured to store environment map information,
   wherein the first processor is configured to:
      acquire an image in surroundings of the moving object;
      obtain feature point information regarding feature points of the acquired image;
      obtain photography environment information in surroundings of the feature points including at least one of brightness information of a photographic subject and weather information in synchronization with acquiring the image;
      associate the feature point information with the photography environment information to set the associated feature point information and the photography environment information as first environment map information;
      transmit, to the information storing apparatus, the first environment map information and a request for retrieving second environment map information which is similar to the first environment map information from previous environment map information prior to the first environment map information which is stored in the information storing apparatus;

receive the second environment map information in response to the request;

compare the feature point information included in the second environment map information with the feature point information included in the first environment map information to estimate the position of the moving object; and apply, with respect to a pair of the associated feature points, relative position coordinates of the features points to the moving object in the first environment map information to absolute position coordinates of the feature points in the second environment map information to estimate the position of the moving object.

2. The moving-object position estimating system according to claim 1, wherein the photography environment information includes photography date and time.

3. The moving-object position estimating system according to claim 1, wherein the brightness information of a photographic subject is determined based on a luminance of the acquired image.

4. The moving-object position estimating system according to claim 1, wherein the weather information is obtained from external weather information.

5. The moving-object position estimating system according to claim 1, wherein the first processor is configured to:

associate relative position coordinates to the moving object with the feature points of the image; and associate the feature points that are same or similar to each other between the feature point information in the first environment map information and the feature point information in the second environment map information in which absolute position coordinates of the feature points are defined.

6. An information processing apparatus comprising:

a memory configured to store a moving-object position estimating program; and a processor configured to, based on the moving-object position estimating program, perform a processing to:

acquire an image in surroundings of a moving object;

obtain feature point information regarding feature points of the acquired image;

obtain photography environment information in surroundings of the feature points including at least one of brightness information of a photographic subject and weather information in synchronization with acquiring the image;

associate the feature point information with the photography environment information to set the associated feature point information and the photography environment information as the first environment map information;

transmit, to an information storing apparatus, the first environment map information and a request for retrieving second environment map information which is similar to the first environment map information from previous environment map information prior to the first environment map information which is stored in the information storing apparatus;

receive the second environment map information;

compare the feature point information included in the second environment map information with the feature point information included in the first environment map information to estimate the position of the moving object; and apply, with respect to a pair of the associated feature points, relative position coordinates of the features points to the moving object in the first environment map information to absolute position coordinates of the feature points in the second environment map information to estimate the position of the moving object.

7. The information processing apparatus according to claim 6, wherein the photography environment information includes photography date and time.

8. The information processing apparatus according to claim 6, wherein the brightness information of a photographic subject is determined based on a luminance of the acquired image.

9. The information processing apparatus according to claim 6, wherein the weather information is obtained from external weather information.

10. The information processing apparatus according to claim 6, wherein the processor is configured to:

associate relative position coordinates to the moving object with the feature points of the image; and associate the feature points that are same or similar to each other between the feature point information in the first environment map information and the feature point information in the second environment map information in which absolute position coordinates of the feature points are defined.

11. A moving-object position estimating method comprising:

acquiring, by a computer, an image in surroundings of a moving object;

obtaining feature point information regarding feature points of the acquired image;

obtaining photography environment information in surroundings of the feature points including at least one of brightness information of a photographic subject and weather information in synchronization with acquiring the image;

associating the feature point information with the photography environment information to set the associated feature point information and the photography environment information as the first environment map information;

transmitting, to an information storing apparatus, the first environment map information and a request for retrieving second environment map information which is similar to the first environment map information from previous environment map information prior to the first environment map information which is stored in the information storing apparatus;

receiving the second environment map information;

comparing the feature point information included in the second environment map information with the feature point information included in the first environment map information to estimate the position of the moving object; and applying, with respect to a pair of the associated feature points, relative position coordinates of the features points to the moving object in the first environment map information to absolute position coordinates of the feature points in the second environment map information to estimate the position of the moving object.

12. The moving-object position estimating method according to claim 11, wherein the photography environment information includes photography date and time.

13. The moving-object position estimating method according to claim 11, wherein the brightness information of a photographic subject is determined based on a luminance of the acquired image.

14. The moving-object position estimating method according to claim 11, wherein the weather information is obtained from external weather information.

15. The moving-object position estimating method according to claim 11, further comprising:
- associating relative position coordinates to the moving object with the feature points of the image; and
- associating the feature points that are same or similar to each other between the feature point information in the first environment map information and the feature point information in the second environment map information in which absolute position coordinates of the feature points are defined.

* * * * *